United States Patent [19]

Cunningham

[11] 4,345,222
[45] Aug. 17, 1982

[54] SPLIT PHASE DELAY EQUALIZER WITH STRAY REACTANCE COMPENSATION

[75] Inventor: Vernon R. Cunningham, Melissa, Tex.

[73] Assignee: Rockwell International Corporation, El Segundo, Calif.

[21] Appl. No.: 214,368

[22] Filed: Dec. 8, 1980

[51] Int. Cl.³ .............................................. H03H 7/03
[52] U.S. Cl. ................................... 333/28 R; 330/294
[58] Field of Search ............. 333/28 R, 138; 328/155; 330/151, 294

[56] References Cited

U.S. PATENT DOCUMENTS 3,517,223  6/1970  Gaunt, Jr. ........................ 328/155 X
3,868,604  2/1975  Tongue ............................. 333/28 R

OTHER PUBLICATIONS

A. H. Naegeli, "IF Filters for the 8901A Modulation Analyzer", *Hewlett Packard Journal*, Nov. 1979, p. 10.
H. Shiki et al., "IF Variable Equalizers for FM Microwave Radio Links" *IEEE Transactions on Communications*, vol. COM-22,7, Jul. 1974, pp. 941-950.
V. Cunningham, "Design Single Section Delay Equalizers", *Electronic Design 19*, Sep. 13, 1976, pp. 82-87.
S. Rosenfield et al., "Group Delay Equalization in Communications Systems", *Comstron Application Data Bulletin 175*, pp. 1-9.
Arthur B. Williams, "Unconventional Active Filters", *Active Filter Design*, 1975, pp. 93, 95, 97, 99, 100.

*Primary Examiner*—Paul L. Gensler
*Attorney, Agent, or Firm*—Bruce C. Lutz; Howard R. Greenberg; H. Fredrick Hamann

[57] ABSTRACT

Stray reactance compensation is provided in a split phase delay equalizer by inserting an auxiliary compensating small reactance in the substantially real arm circuit branch which provides a third order response equal and opposite to the deviation from second to third order in the amplitude response curve caused by stray reactance deviated phase reversal from the ideal.

12 Claims, 3 Drawing Figures

SPLIT PHASE DELAY EQUALIZER WITH STRAY REACTANCE COMPENSATION

TECHNICAL FIELD

The invention relates to delay equalizers used to compensate for unwanted delay variations in filters, telephone lines, microwave radio links, and other equipment used for signal transmission. The invention more particularly relates to delay equalizers of the split phase type.

BACKGROUND

Delay equalizers are well known, and generally provide an increased delay at or around a resonant frequency at which a filter or the like exhibits a reduced delay, to provide compensation therefor. Delay equalizers of the split phase type are also known, and generally have two separate signal paths 180 degrees out of phase and summed together into a common load impedance.

A split phase delay equalizer has an amplitude response which exhibits a slight decrease or dip at or around the resonant frequency due to component Q loss (e.g., the quality factor of inductors and/or capacitors). An example of this dip is shown in "Group Delay Equalization in Communications Systems", Rosenfield et al, Application/Data Bulletin 175, Comstron SEG, p. 7, FIG. 15. This deviation from true all-pass characteristics (i.e., a non-flat amplitude response) can usually be compensated by slight changes in the design of the delay equalizer and/or its associated circuitry.

The 180 degree phase reversal is seldom ideal, due to imperfect components used to perform the phase inversion. This deviation from ideal phase reversal causes the amplitude response of the equalizer to exhibit something other than a simple dip at the resonant frequency. For example, instead of a second order parabolic type of dip curve, the amplitude response may exhibit a rise and then a dip analagous to a full sine wave. This more erratic third order deviation (e.g. full sine wave) is much more difficult to compensate. In equipment where small amplitude deviations are of concern, such as long haul telecommunication equipment, such an erratic deviation becomes a severe problem.

SUMMARY

The present invention provides an improved split phase delay equalizer with stray reactance compensation for phase reversal deviating from the ideal. Compensation is provided by effecting an auxiliary third order response characteristic opposing the deviation from second to third order in the amplitude response curve caused by stray reactance. An auxiliary compensating reactance network is connected in the real arm circuit branch and provides a deviation in the amplitude response curve around the resonant frequency which opposes each rise and dip of the amplitude response curve caused by imperfect phase reversal.

DETAILED DESCRIPTION

Figure 1:
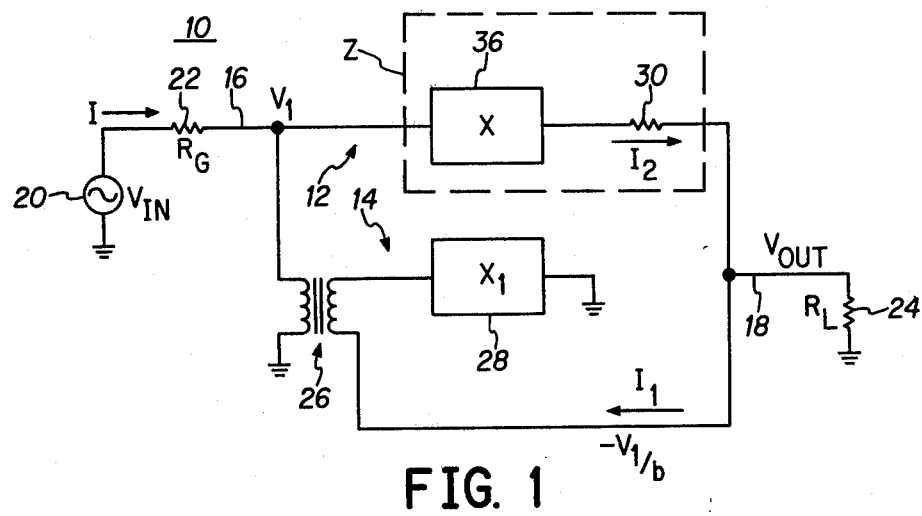
FIG. 1 is a circuit diagram showing a split phase delay equalizer with stray reactance compensation, constructed in accordance with the invention.

FIG. 1 shows a split phase delay equalizer 10 having a pair of circuit branches 12 and 14 connected in parallel between input 16 and output 18. Generator source 20 delivers a signal through generator impedance 22, having a value $R_G$, and then through circuit branches 12 and 14 to load resistance 24, having a value $R_L$. Transformer 26 provides 180 degree phase inversion of the signal in branch 14 relative to the signal in branch 12. Circuit branch 14 also includes a reactance network 28 which further phase shifts the signal in branch 14 relative to the signal in branch 12. This phase shift occurs around the resonant frequency of network 28, to provide an increased delay. This increased delay may be used to compensate the reduced delay of a filter or other device.

Circuit branch 14 is the reactance arm and circuit branch 12 the real arm of the split phase delay equalizer. Phase inversion means 26 may be placed in either circuit branch. Real arm circuit branch 12 includes a resistance 30 and may also be called the resistance arm.

Figure 3:
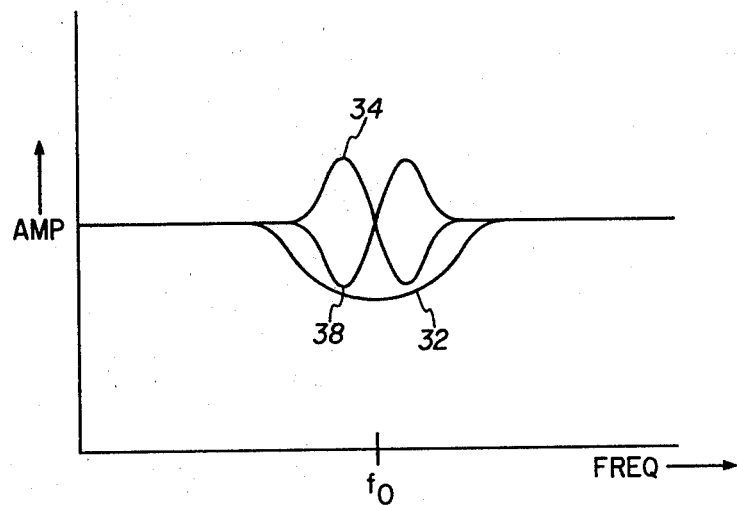
FIG. 3 is an amplitude response curve illustrating the compensation provided by the present invention.

The circuit described thus far has an amplitude response curve like that designated 32 in FIG. 3 when components with a finite Q are used and when transformer or phase inversion means 26 provides ideal phase reversal. FIG. 3 plots amplitude versus frequency. At about the resonant frequency $f_0$ of the tank or reactance network 28, there is a decrease or slight dip in the amplitude output of the equalizer. Dip 32 is a second order parabolic type curve. This type of deviation from true all-pass characteristics can be compensated for without too much difficulty in the design of the circuitry associated with the delay equalizer.

When the phase reversal provided by transformer 26 is not ideal, stray reactances cause the amplitude response curve to deviate from the expected second order dip shape 32 and instead produce a third order shape 34 (e.g., analogous to a single sine wave), or its inverse 38. In the present invention, a compensating auxiliary reactance 36 is connected in the real or resistance arm circuit branch 12, which corrects the phase relationship between the two arms 12 and 14 back to the desired 180 degree difference when reactance 36 has an appropriately chosen impedance value, described more fully hereinafter.

Whether inductive or capacitive compensation is used in the auxiliary reactance depends on the particular form of the split phase circuit used and whether the phase difference is leading or lagging its ideal value. If a circuit requires capacitance in the auxiliary reactance to compensate response 34, then the same circuit would require inductance in the auxiliary reactance to compensate response 38, and vice versa. After the proper amount of compensation, the amplitude response curve again becomes that of a typical second order dip curve 32.

Figure 2:
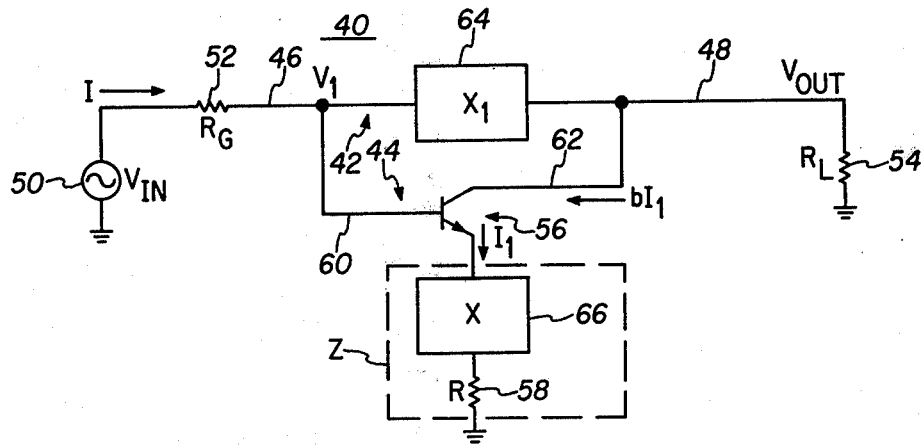
FIG. 2 is a circuit diagram showing an alternate embodiment of the circuit of FIG. 1.

FIG. 2 shows another embodiment of a split phase delay equalizer with stray reactance compensation. Equalizer 40 has a pair of circuit branches 42 and 44 connected in parallel between input 46 and output 48. Generator source 50 delivers a signal through generator impedance 52, having a value $R_G$ and then through circuit branches 42 and 44 to load impedance 54, having a value $R_L$. 180 degrees phase inversion is provided by a transistor 56 in branch 44. The emitter of transistor 56 is connected to ground through a resistor 58 and reactance 66. The base of transistor 56 is connected to input 46. The signal on base lead 60 is 180 degrees out of phase with the signal on collector lead 62 if phase reversal is ideal.

Circuit branch 42 is the reactance arm and has a reactance network 64 connected between input 46 and output 48. Reactance network 64 is in feedback relation between the collector and base of transistor 56. Reactance network 64 provides a phase shift of the signal in branch 42 relative to the signal in branch 44 around the resonant frequency of network 64, to provide an increased delay. This increased delay may be used to compensate the reduced delay of a filter or other device at a given frequency.

Auxiliary compensating reactance 66 is added in the real arm circuit branch 44 to compensate stray reactance which causes third order deviations from true all-pass characteristics in the amplitude response curve. Compensating reactance 66 is comparable to reactance 36 of FIG. 1.

In an alternate embodiment of FIG. 2, auxiliary compensating reactance 66 is connected between base lead 60 and ground. In another alternate embodiment, auxiliary compensating reactance 66 is connected in series in collector lead 62. In each of these embodiments, resistor 58 remains connected between the emitter of transistor 56 and ground.

In further alternate embodiments, the auxiliary compensating reactance may be placed in the real arm circuit branch in parallel with the resistance therein. For example, auxiliary compensating reactance 36 may be placed in parallel with resistor 30 in FIG. 1, and auxiliary compensating reactance 66 may be placed in parallel with resistor 58 in FIG. 2.

It has been found that the above-noted stray reactance causing third order deviations may be compensated for by placing a reactance such as 36 in the real arm circuit branch of the split phase delay equalizer of FIG. 1 such that the resulting impedance Z of real arm 12 satisfies equation (1).

$$Z = \frac{-R_L(1-b)}{2} \pm (\tfrac{1}{2})\sqrt{R_L^2(1-b)^2 + 8R_G R_L(1+b)} \quad (1)$$

$R_L$ and $R_G$ are as above noted, Z is the impedance of reactance 36, and b is a complex number specifying the deviated phase shift between the input and output of transformer 26.

Equation (1) will now be derived, including the condition for allpass for the circuit of FIG. 1 for the case where the phase of the voltage out of transformer 26 is a function of frequency, as represented by the factor b, where b is a complex frequency variable. Equations (2) through (6) are the loop equations for the circuit of FIG. 1.

$$V_{in} = IR_G + I_2 Z + R_L(I_2 - I_1) \quad (2)$$

$$V_{in} = IR_G + V_1 \quad (3)$$

$$(V_1/b) = I_1 X_1 + (I_1 - I_2) R_L \quad (4)$$

$$V_{out} = R_L(I_2 - I_1) \quad (5)$$

$$I_1 + I_2 = I \quad (6)$$

Substituting equation (6) into equation (2) yields equation (7).

$$V_{in} = I_1(R_G - R_L) + I_2(R_L + R_G + Z) \quad (7)$$

Substituting equation (4) into equation (3) yields equation (8).

$$V_{in} = I_1 R_G + I_2 R_G + bI_1 X_1 + bI_1 R_L - bI_2 R_L \quad (8)$$

$$= I_1(R_G + bX_1 + bR_L) + I_2(R_G - bR_L)$$

Rearranging equation (5) yields equation (9).

$$I_2 = (V_{out}/R_L) + I_1 \quad (9)$$

Substituting equation (9) into equation (7) yields equation (10).

$$V_{in} = I_1(R_G - R_L) + (R_L + R_G + Z)\left(\frac{V_{out}}{R_L} + I_1\right) \quad (10)$$

Substituting equation (9) into equation (8) yields equation (11).

$$V_{in} = I_1(R_G + bX_1 + bR_L) + (R_G - bR_L)\left(\frac{V_{out}}{R_L} + I_1\right) \quad (11)$$

Solving equations (10) and (11) for $I_1$ and equating the results to eliminate $I_1$ yields equation (12).

$$\frac{V_{in} - \frac{V_{out}}{R_L}(R_L + R_G + Z)}{2R_G + Z} = \frac{V_{in} - \frac{V_{out}}{R_L}(R_G - bR_L)}{2R_G + bX_1} \quad (12)$$

The transfer function T of the circuit of FIG. 1 is given by the ratio of the output voltage to the input voltage. Clearing fractions in equation (12) and solving for this ratio yields equations (13) through (16).

$$V_{in}(2R_G + bX_1) - \frac{V_{out}}{R_L}(R_L + R_G + Z)(2R_G + bX_1) = \quad (13)$$

$$V_{in}(2R_G + Z) - \frac{V_{out}}{R_L}(R_G - bR_L)(2R_G + Z)$$

$$V_{in}(2R_G + bX_1 - 2R_G - Z)R_L = V_{out}(2R_G R_L + \quad (14)$$

$$2R_G^2 + 2R_G Z + bX_1 R_L + bX_1 R_G + bX_1 Z - 2R_G^2 -$$

$$R_G Z + 2bR_G R_L + bZR_L)$$

$$T = \frac{V_{out}}{V_{in}} = \quad (15)$$

$$\frac{bX_1 - Z}{bX_1(R_L + R_G + Z) + 2R_G R_L(1+b) + ZR_G + bZR_L}$$

$$T = \frac{V_{out}}{V_{in}} = \quad (16)$$

$$\frac{X_1 - \frac{Z}{b}}{X_1(R_L + R_G + Z) + \left[2R_G R_L\left(1 + \frac{1}{b}\right) + ZR_L + \frac{ZR_G}{b}\right]} =$$

-continued $$\frac{X_1 - \frac{Z}{b}}{(R_L + R_G + Z)\left[X_1 + \frac{2R_GR_L\left(1 + \frac{1}{b} + ZR_L + \frac{ZR_G}{b}\right)}{R_L + R_G + Z}\right]}$$

Equation (16) represents the transfer function of the circuit of FIG. 1, i.e., the ratio of the output voltage to the input voltage.

Equation (16) will now be compared against the transfer function for an ideal circuit with lossless components. Equation (17) shows a generalized ideal transfer function recognized throughout the literature.

$$T = \frac{X' - R'}{\frac{1}{A'}(X' + R'')} \tag{17}$$

$A'$ is the flat loss which is the ratio of the output voltage across the load impedance to the open circuit generator input voltage. For the all-pass condition to be satisfied, $R'$ equals $R''$ where $R'$ and $R''$ are resistances and $X'$ is a reactance.

Comparing the general form in equation (17) to the transfer function of the circuit of FIG. 1 in equation (16), it will be recognized that the particular all-pass condition for the circuit of FIG. 1 is shown in equation (18).

$$\frac{Z}{b} = \frac{2R_GR_L\left(1 + \frac{1}{b}\right) + ZR_L + \frac{ZR_G}{b}}{R_L + R_G + Z} \tag{18}$$

The flat loss A is given by equation (19).

$$A = \frac{1}{R_L + R_G + Z} \tag{19}$$

Equation (18) shows the all-pass condition if Z is real. In real world conditions, Z will not be entirely real, since it will be allowed to assume the form of a real component plus a reactance (L or C) in order to correct for the unwanted phase shift b. However, the approximation to obtain the all-pass condition is sufficiently close over the band of interest since the sum of $R_G$ and $R_L$ plus the real part of Z is large in comparison to the reactive part of Z. This deviation from all-pass shows up in the term for flat loss A, equation (19). In practice, the deviation from ideal involved in the approximation can be satisfactorily compensated over the band of interest by adjusting the value of the real part of Z in the all-pass condition from its calculated value. This correction may not be accurate at all frequencies, but will be satisfactory over bandwidths commonly encountered, e.g., about 30% or less. Rearranging equation (18) yields equation (20).

$$\frac{Z}{b}(R_L + R_G + Z) = \tag{20}$$

$$Z\left(R_L + \frac{R_G}{b}\right) + 2R_GR_L\left(1 + \frac{1}{b}\right)$$

Rearranging equation (20) yields equation (21).

$$\frac{Z^2}{b} + ZR_L\left(\frac{1}{b} - 1\right) - 2R_GR_L\left(1 + \frac{1}{b}\right) = 0 \tag{21}$$

Rearranging equation (21) yields equation (22).

$$Z^2 + ZR_L(1-b) - 2R_GR_L(1+b) = 0 \tag{22}$$

Solving equation (22) for Z using the quadratic equation yields equation (23), which is identical to equation (1) above.

$$Z = \frac{-R_L(1-b)}{2} \pm (\tfrac{1}{2})\sqrt{R_L^2(1-b)^2 + 8R_GR_L(1+b)} \tag{23}$$

Equation (23) completely defines the real and imaginary parts of Z since b is a complex number. In order to facilitate a better understanding of this result, a special case will be considered, namely when $R_G$ equals $R_L$. Substituting $R_G$ for $R_L$ in equation (23) and simplifying the result yields equations (24) through (27).

$$Z = \frac{-R_L(1-b)}{2} \pm (\tfrac{1}{2})\sqrt{R_L^2(1-b)^2 + 8R_L^2(1+b)} \tag{24}$$

$$Z = \frac{-R_L(1-b)}{2} \pm \frac{R_L}{2}\sqrt{1 - 2b + b^2 + 8 + 8b} \tag{25}$$

$$Z = \frac{R_L}{2}(b - 1 \pm \sqrt{b^2 + 6b + 9}) \tag{26}$$

$$Z = \frac{R_L}{2}(b - 1 \pm (b + 3)) \tag{27}$$

Use of the negative sign in equation (27) would result in a trivial case where Z would have no reactive part, since b would cancel out. Using the plus sign in equation (27) thus yields equation (28).

$$Z = \frac{R_L}{2}(2b + 2) = R_L(1 + b) \tag{28}$$

Resolving b into real and imaginary parts C and jD is shown in equation (29).

$$b = C + jD \tag{29}$$

Substituting equation (29) into equation (28) yields equation (30).

$$Z = R_L(1 + C + jD) \tag{30}$$

Resolving equation (30) into its real and imaginary components yields the real and imaginary components of Z as shown in equations (31) and (32).

$$Z_{real} = R_L(1 + C) \tag{31}$$

$$Z_{imag} = R_L D \tag{32}$$

By measuring the values of C+jD at the resonant frequency of resistance 28, equations (31) and (32) can be used to calculate the values of resistor 30 and reactance 36 in FIG. 1.

If $R_L$ is not equal to $R_G$, equation (23) may be used to solve for the real and imaginary parts of Z by using iterative methods.

Turning now to the circuit of FIG. 2, it has been found that the above-noted stray reactance causing third order deviations may be compensated for by placing a reactance such as 66 in the real arm circuit branch of the split phase delay equalizer of FIG. 2 such that the resulting impedance Z of real arm 44 satisfies the relations now to be derived.

Equations (33) through (36) are the loop equations for the circuit of FIG. 2.

$$V_{in} = IR_G + V_1 \quad (33)$$

$$V_1 = I_1 Z \quad (34)$$

$$V_1 = IX_1 + V_{out} \quad (35)$$

$$V_{out} = R_L(I - bI_1) \quad (36)$$

b is a complex number specifying the deviated phase shift between the current out of transistor 56 and the voltage into the transistor 56 (on base 60).

Substituting equation (34) into equation (33) yields equation (37).

$$V_{in} = IR_G + I_1 Z \quad (37)$$

Substituting equation (34) into equation (35) yields equation (38).

$$I_1 Z = IX_1 + V_{out} \quad (38)$$

Rearranging equation (38) yields equation (39).

$$I_1 = \frac{IX_1 + V_{out}}{Z} \quad (39)$$

Substituting equation (39) into equation (37) yields equation (40).

$$V_{in} = IR_G + IX_1 + V_{out} \quad (40)$$

Rearranging equation (40) yields equation (41).

$$I = \frac{V_{in} - V_{out}}{R_G + X_1} \quad (41)$$

Substituting equation (39) into equation (36) yields equation (42).

$$V_{out} = R_L I - R_L b \left( \frac{IX_1}{Z} + \frac{V_{out}}{Z} \right) \quad (42)$$

Rearranging equation (42) yields equation (43).

$$V_{out} + V_{out} \frac{bR_L}{Z} = I \left( R_L - \frac{bR_L X_1}{Z} \right) \quad (43)$$

Substituting equation (41) into equation (43) yields equation (44).

$$V_{out} + V_{out} \frac{bR_L}{Z} = \left( \frac{V_{in} - V_{out}}{R_G + X_1} \right) \left( R_L - \frac{bR_L X_1}{Z} \right) \quad (44)$$

Rearranging equation (44) to have $V_{in}$ on one side and $V_{out}$ on the other side yields equation (45).

$$V_{out} \left( 1 + \frac{bR_L}{Z} + \frac{R_L - \frac{bR_L X_1}{Z}}{R_G + X_1} \right) = V_{in} \left( \frac{R_L - \frac{bR_L X_1}{Z}}{R_G + X_1} \right) \quad (45)$$

The transfer function T of the circuit of FIG. 2 is given by the ratio of the output voltage to the input voltage. Rearranging equation (45) to solve for this ratio and reducing and clearing fractions yields equations (46) through (57).

$$T = \frac{V_{out}}{V_{in}} = \frac{\left( \frac{R_L - \frac{bR_L X_1}{Z}}{R_G + X_1} \right)}{\left( 1 + \frac{bR_L}{Z} + \frac{R_L - \frac{bR_L X_1}{Z}}{R_G + X_1} \right)} \quad (46)$$

$$T = \frac{V_{out}}{V_{in}} = \frac{R_L - \frac{bR_L X_1}{Z}}{(R_G + X_1)\left(1 + \frac{bR_L}{Z}\right) + R_L - \frac{bR_L X_1}{Z}} \quad (47)$$

$$T = \frac{V_{out}}{V_{in}} = \frac{R_L - \frac{bR_L X_1}{Z}}{R_G + \frac{R_G bR_L}{Z} + X_1 + \frac{X_1 bR_L}{Z} + R_L - \frac{bR_L X_1}{Z}} \quad (48)$$

$$T = \frac{V_{out}}{V_{in}} = \frac{ZR_L - bR_L X_1}{ZR_G + R_G bR_L + ZX_1 + X_1 bR_L + ZR_L - bR_L X_1} \quad (49)$$

$$T = \frac{V_{out}}{V_{in}} = \frac{ZR_L - bR_L X_1}{ZR_G + R_G bR_L + ZX_1 + ZR_L} \quad (50)$$

$$T = \frac{V_{out}}{V_{in}} = \frac{-R_L(bX_1 - Z)}{ZR_G + R_G bR_L + ZX_1 + ZR_L} \quad (51)$$

$$T = \frac{V_{out}}{V_{in}} = \frac{-R_L\left(X_1 - \frac{Z}{b}\right)}{\frac{ZR_G}{b} + R_G R_L + \frac{ZX_1}{b} + \frac{ZR_L}{b}} \quad (52)$$

$$T = \frac{V_{out}}{V_{in}} = \frac{-R_L\left(X_1 - \frac{Z}{b}\right)}{\frac{Z}{b}(X_1 + R_L + R_G) + R_G R_L} \quad (53)$$

$$T = \frac{V_{out}}{V_{in}} = \frac{-R_L\left(X_1 - \frac{Z}{b}\right)}{\frac{Z}{b}\left[X_1 + \left(R_L + R_G + \frac{R_G R_L}{\frac{Z}{b}}\right)\right]} \quad (54)$$

$$T = \frac{V_{out}}{V_{in}} = \frac{X_1 - \frac{Z}{b}}{\frac{Z}{-R_L}\left[X_1 + \left(R_L + R_G + \frac{R_G R_L}{\frac{Z}{b}}\right)\right]} \quad (55)$$

Equation (55) represents the transfer function of the circuit of FIG. 2, i.e., the ratio of the output voltage to the input voltage.

Equation (55) is now compared against the above-noted generalized ideal transfer function, equation (17). For the all-pass condition, $R'=R''$ and are as previously defined in connection with equation (17). It is thus recognized that the particular all-pass condition for the circuit of FIG. 2, upon comparison of equations (55) and (17), is shown in equation (56).

$$\frac{Z}{b} = R_L + R_G + \frac{R_G R_L}{\frac{Z}{b}} \quad (56)$$

As will now be shown, equation (56) is the same condition as that for the circuit of FIG. 2 with no phase shift on current $I_1$ in the collector circuit of transistor 56.

Equations (57) through (60) are the loop equations for the circuit of FIG. 2 with reactance 66 removed such that only resistance 58 remains. R is the resistance value of resistor 58.

$$V_{in} = IR_G + V_1 \quad (57)$$

$$V_1 = I_1 R \quad (58)$$

$$V_1 = IX_1 + V_{out} \quad (59)$$

$$V_{out} = R_L(I - I_1) \quad (60)$$

Substituting equation (58) into equation (57) yields equation (61).

$$V_{in} = IR_G + I_1 R \quad (61)$$

Substituting equation (59) into equation (57) yields equation (62).

$$V_{in} = IR_G + IX_1 + V_{out} \quad (62)$$

Solving equation (60) for $I_1$ yields equation (63).

$$I_1 = \frac{IR_L - V_{out}}{R_L} = I - \frac{V_{out}}{R_L} \quad (63)$$

Substituting equation (63) into equation (61) yields equation (64).

$$V_{in} = IR_G + IR - \frac{R V_{out}}{R_L} \quad (64)$$

Solving equation (62) for I yields equation (65).

$$I = \frac{V_{in} - V_{out}}{R_G + X_1} \quad (65)$$

Substituting equation (65) into equation (64) yields equation (66).

$$V_{in} = R_G\left(\frac{V_{in} - V_{out}}{R_G + X_1}\right) + R\left(\frac{V_{in} - V_{out}}{R_G + X_1}\right) - \frac{R V_{out}}{R_L} \quad (66)$$

Expanding equation (66) yields equation (67).

$$V_{in} = \frac{R_G}{R_G + X_1} V_{in} - \frac{R_G}{R_G + X_1} V_{out} + \frac{R}{R_G + X_1} V_{in} - \frac{R}{R_G + X_1} V_{out} - \frac{R}{R_L} V_{out} \quad (67)$$

Rearranging equation (67) yields equation (68).

$$V_{out}\left(\frac{R_G + R}{R_G + X_1} + \frac{R}{R_L}\right) = V_{in}\left(\frac{R_G + R}{R_G + X_1} - 1\right) \quad (68)$$

Solving equation (68) for the transfer function T, which is the ratio of the output voltage to the input voltage, yields equation (69).

$$T = \frac{V_{out}}{V_{in}} = \frac{\frac{R_G + R}{R_G + X_1} - 1}{\frac{R_G + R}{R_G + X_1} + \frac{R}{R_L}} \quad (69)$$

Expanding equation (69) yields equation (70).

$$T = \frac{V_{out}}{V_{in}} = \frac{\frac{R_G + R - R_G - X_1}{R_G + X_1}}{\frac{R_G R_L + RR_L + RR_G + X_1 R}{(R_G + X_1) R_L}} \quad (70)$$

Simplifying and cancelling terms in equation (70) yields equation (71).

$$T = \frac{V_{out}}{V_{in}} = \frac{R - X_1}{\frac{R_G R_L + RR_L + RR_G + X_1 R}{R_L}} \quad (71)$$

Further simplifying equation (71) yields equation (72).

$$T = \frac{V_{out}}{V_{in}} = \frac{R - X_1}{\frac{R}{R_L}\left[\left(R_L + R_G + \frac{R_G R_L}{R}\right) + X_1\right]} \quad (72)$$

Comparing equation (72) against the generalized ideal transfer function, equation (17), it will be recognized that the particular all-pass condition for the circuit represented by equation (72) is that shown in equation (73)

$$R = R_L + R_G + \frac{R_G R_L}{R} \quad (73)$$

Equation (56) shows the all-pass condition for the circuit of FIG. 2 with impedance 66 included. Equation (73) shows the all-pass condition for the circuit of FIG. 2 with impedance 66 omitted, and no unwanted phase shift of the current $I_1$ in the collector circuit of transistor 56. Comparing equations (56) and (73), it is seen that they present the same conditions if $R=(Z/b)$, as shown by equation (74).

$$Z/b=R \qquad (74)$$

It is thus seen that the unwanted phase shift b may be easily compensated by setting Z equal to bR, equation (75).

$$Z=bR \qquad (75)$$

Resolving b into real and imaginary parts C and jD is shown in equation (76).

$$b=C+jD \qquad (76)$$

Substituting equations (76) into equation (75) yields equation (77).

$$Z=R(C+jD) \qquad (77)$$

Resolving equation (77) into its real and imaginary components yields the real and imaginary components of Z as shown in equations (78) and (79).

$$Z_{real}=CR \qquad (78)$$

$$Z_{imag}=DR \qquad (79)$$

Equations (78) and (79) give the values of resistor 58 and impedance 66, respectively, to compensate for the measured value of b.

It is recognized that various modifications are possible within the scope of the appended claims.

I claim:

1. A split phase delay equalizer with stray reactance compensation, comprising:
   a pair of circuit branches connected in parallel between an input and an output;
   phase inversion means providing phase reversal between signals in said branches;
   reactance means in one of said branches for providing a phase shift of the signal in that branch at a given frequency to afford an increased delay at such frequency; and
   auxiliary compensating reactance means in the other of said circuit branches for compensating third order amplitude response of said equalizer around said given frequency wherein said auxiliary compensating reactance means provides a third order rise and dip opposing third order rise and dip in the amplitude response curve caused by stray reactance.

2. The invention according to claim 1 comprising generator impedance means of value $R_G$ at said input and load impedance means of value $R_L$ at said output, and wherein said auxiliary compensating reactance means effects an impedance value Z of said other circuit branch satisfying $$Z = \frac{-R_L(1-b)}{2} \pm (\tfrac{1}{2}) \sqrt{R_L^2(1-b)^2 + 8R_GR_L(1+b)}$$

where b is a complex number specifying the deviated phase shift from the ideal 180 degree differential between signals in said branches after passage through said phase inversion means.

3. The invention according to claim 2 wherein $R_G=R_L$, and $Z=R_L(1+b)$.

4. The invention according to claim 1 wherein said auxiliary compensating reactance means effects an impedance value Z of said other circuit branch satisfying $$Z=bR$$

where b is a complex number specifying unwanted deviated phase shift from the ideal 180 degree differential between the signals in said branches, and R is the resistance value in said other circuit branch.

5. A split phase delay equalizer with stray reactance compensation, comprising:
   a pair of circuit branches connected in parallel between an input and an output, one of said circuit branches being a substantially real arm and the other circuit branch being a reactance arm;
   phase inversion means located in only one of said circuit branches for providing phase reversal between signals in said circuit branches, said equalizer having an amplitude response curve with a second order decrease or dip in a given frequency region when phase reversal is ideal; and
   auxiliary compensating reactance means in said real arm circuit branch for compensating third order deviations in said amplitude response curve in said given frequency region.

6. The invention according to claim 5 wherein said phase inversion means comprises a transformer in said reactance arm.

7. The invention according to claim 5 wherein said phase inversion means comprises a transistor in said real arm, the base of said transistor connected to said input, and one of the emitter and collector of said transistor connected to said output.

8. The invention according to claim 7 wherein said auxiliary compensating reactance means is connected to the other of said emitter and collector of said transistor.

9. The invention according to claim 7 wherein said auxiliary compensating reactance means is connected to said base of said transistor.

10. The invention according to claim 7 wherein said auxiliary compensating reactance means is connected to said one of said emitter and collector of said transistor.

11. A method for compensating third order amplitude response deviations from ideal phase reversal in a split phase delay equalizer type circuit having separate signal paths 180 degrees out of phase which are summed together into a common load impedance, said circuit having a substantially real arm and a reactance arm, and load impedance $R_L$ and generator impedance $R_G$, comprising placing in said real arm an auxiliary compensating reactance causing an impedance Z in said real arm satisfying $$Z = \frac{-R_L(1-b)}{2} \pm (\tfrac{1}{2}) \sqrt{R_L^2(1-b)^2 + 8R_GR_L(1+b)}$$

where b is a complex number specifying the deviated phase shift from the ideal 180 degree differential between signals in said branches after passage through said phase inversion means.

12. A method for compensating third order amplitude response deviations from ideal phase reversal in a split phase delay equalizer type circuit having separate signal paths 180 degrees out of the phase which are summed together into a common load impedance, said circuit having a substantially real arm and a reactance arm, comprising placing in said real arm an auxiliary compensating reactance causing an impedance Z in said real arm satisfying $$Z = bR$$

where b is a complex number specifying unwanted deviated phase shift between the ideal 180 degree differential between the signals in said arms and R is the value of resistance in said real arm.

* * * * *